United States Patent [19]
Nicklos et al.

[11] Patent Number: 5,912,786
[45] Date of Patent: Jun. 15, 1999

[54] DISK DRIVE APPARATUS HAVING AN IMPROVED SPINDLE MOTOR LOADING MECHANISM

[75] Inventors: Carl F. Nicklos, Ogden; Mark S. Thayne, West Point; David E. Jones, Layton; Ralph L. Sonderegger, Farmington; Reed J. Moody, Coalville, all of Utah

[73] Assignee: Iomega Corporation, Roy, Utah

[21] Appl. No.: 08/656,718

[22] Filed: Jun. 3, 1996

[51] Int. Cl.$^6$ .......................... G11B 17/04; G11B 19/20
[52] U.S. Cl. .................... 360/99.09; 360/99.06; 369/77.2
[58] Field of Search .......................... 360/99.09, 99.08, 360/99.06, 99.02, 97.01; 369/75.1, 75.2, 77.1, 77.2

[56] References Cited

U.S. PATENT DOCUMENTS

| | | | |
|---|---|---|---|
| 4,400,748 | 8/1983 | Bauck, et al. | 360/99 |
| 4,419,703 | 12/1983 | Gruczelak et al. | 360/97 |
| 4,445,157 | 4/1984 | Takahashi | 360/133 |
| 4,482,993 | 11/1984 | Agostini | 369/263 |
| 4,502,083 | 2/1985 | Bauck, et al. | 360/99 |
| 4,513,409 | 4/1985 | Staar | 369/77.1 |
| 4,527,264 | 7/1985 | D'Alayer de Costemore d'Arc | 369/77.1 |
| 4,535,374 | 8/1985 | Anderson et al. | 369/77.2 |
| 4,571,646 | 2/1986 | Bauck, et al. | 360/99 |
| 4,581,669 | 4/1986 | Tsuji et al. | 360/97 |
| 4,644,521 | 2/1987 | Davis et al. | 369/291 |
| 4,656,542 | 4/1987 | Shibata | 360/97 |
| 4,663,677 | 5/1987 | Griffith et al. | 360/99.06 |
| 4,683,506 | 7/1987 | Toldi et al. | 360/105 |
| 4,723,185 | 2/1988 | Maeda | 369/77.2 |
| 4,745,500 | 5/1988 | Davis | 360/97 |
| 4,823,214 | 4/1989 | Davis | 360/97.01 |
| 4,953,042 | 8/1990 | Yoshikawa | 360/96.5 |
| 4,965,685 | 10/1990 | Thompson et al. | 360/97.01 |

(List continued on next page.)

FOREIGN PATENT DOCUMENTS

WO 93/18507 9/1993 WIPO.

OTHER PUBLICATIONS

PCT International Search Report dated Sep. 4, 1997, 1 page, International Application No. PCT/US97/08902.

Godwin, J., "In Introduction to the Insite 325 Floptical® Disk Drive", *SPIE, Optical Data Storage Topical Meeting*, 1989, 1078, 71–79.

Grace Specialty Polymers, "Minico® M 2000 RS Carbon Potentiometer Resister Series", *Safety Data*, Dec. 7, 1994.

*Primary Examiner*—David L. Ometz
*Attorney, Agent, or Firm*—Woodcock Washburn Kurtz Mackiewicz & Norris LLP

[57] ABSTRACT

A disk drive apparatus has an eject member that moves in tandem with a disk cartridge from a first position to a second position upon insertion of the disk cartridge into the disk drive apparatus. The eject member has a projection formed thereon. A first spring biases the eject member in a direction opposite the direction of insertion of the removable disk cartridge. A motor ring assembly mounted on a chassis of the apparatus has a rotating member that rotates between an unloaded position and a loaded position. A second spring biases the rotating member toward its loaded position. A spindle motor is mounted in the motor ring assembly. The rotating member has a first cam surface, a second cam surface that extends substantially perpendicularly to the first cam surface, and a lead-in cam angle surface that extends between the first and second cam surfaces at an angle thereto. A shape memory alloy wire or other means is provided to rotate the rotating member from its loaded position toward its unloaded position. As that occurs, the second cam surface of the rotating member moves past the projection on the eject member, thereby allowing the eject member to move back toward its first position under the force of the first spring. This, in turn, allows the projection on the eject member to push against the lead-in cam angle surface of the rotating member to rotate the rotating member further toward its unloaded position.

11 Claims, 10 Drawing Sheets

U.S. PATENT DOCUMENTS

| | | | |
|---|---|---|---|
| 5,005,093 | 4/1991 | Inoue et al. | 369/77.2 |
| 5,025,436 | 6/1991 | Crain et al. | 369/77.2 |
| 5,056,078 | 10/1991 | Carey et al. | 369/77.2 |
| 5,107,484 | 4/1992 | Kawamura et al. | 369/244 |
| 5,153,867 | 10/1992 | Inoue | 369/77.2 |
| 5,204,793 | 4/1993 | Plonczak | 360/133 |
| 5,218,503 | 6/1993 | Martin | 360/133 |
| 5,262,918 | 11/1993 | Tannert | 360/133 |
| 5,317,464 | 5/1994 | Witt et al. | 360/99.08 |
| 5,343,457 | 8/1994 | Hoshi | 369/77.2 |
| 5,416,762 | 5/1995 | Ohmori et al. | 360/99.06 |
| 5,583,710 | 12/1996 | Nicklos et al. | 360/99.07 |
| 5,617,394 | 4/1997 | Jones et al. | 369/77.2 |

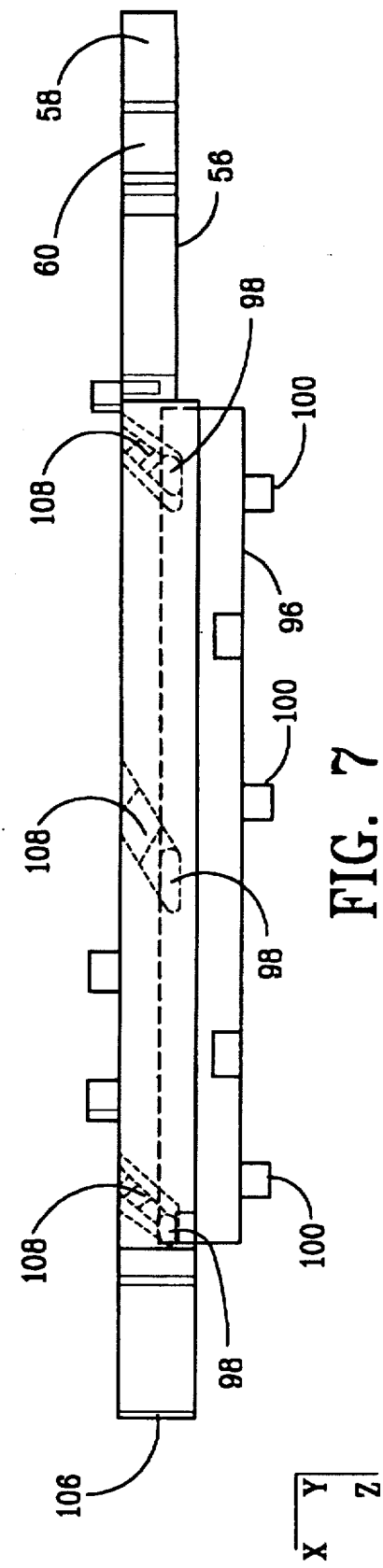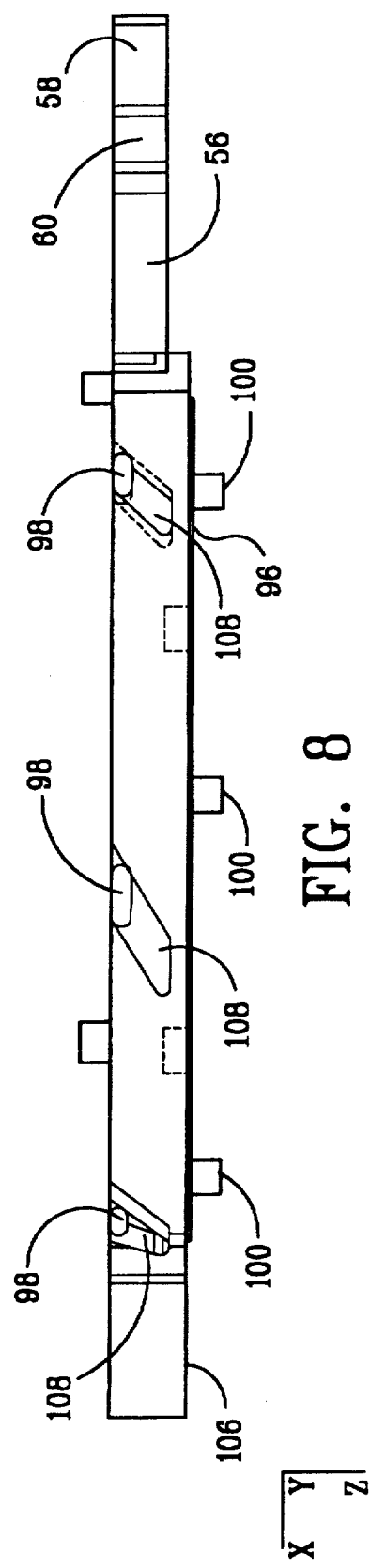

DISK DRIVE APPARATUS HAVING AN IMPROVED SPINDLE MOTOR LOADING MECHANISM

BACKGROUND

1. Field of the Invention

The present invention relates to disk drives of the type that accept removable disk cartridges, and more particularly, to a disk drive apparatus having a mechanism for automatically loading a spindle motor, i.e., moving the spindle motor into engagement with the hub of a disk cartridge upon insertion of the disk cartridge into the drive.

2. Description of the Prior Art

Removable disk cartridges for storing digital electronic information typically comprise an outer casing or shell that houses a rotatable recording medium, or disk, upon which electronic information can be stored. The cartridge shell often comprises upper and lower halves that are joined together to house the disk. The disk is mounted on a hub that rotates freely within the cartridge. When the cartridge is inserted into a disk drive, a motor-driven spindle in the drive must engage the hub in order to rotate the disk(s) within the cartridge.

Standard floppy disk drives typically employ a mechanism that guides the disk cartridge as it is inserted into the drive, so that the hub of the disk is brought downwardly into engagement with a fixed, rotatable spindle. These drives must be of sufficient height to accommodate the vertical movement of the floppy disk. A more preferable solution is to provide a straight insertion path for the cartridge and to move the spindle motor into engagement with the hub of the cartridge.

The popular and commercially successfully Iomega ZIP™ drive provides a straight insertion path for its disk cartridge. Guide rails within the ZIP™ drive guide the cartridge straight into the drive. When the cartridge reaches a certain point during insertion, the front peripheral edge of the cartridge contacts a cartridge receiving stop on a movable platform within the drive. The spindle motor of the disk drive is mounted on the movable platform. Continued insertion of the cartridge into the drive pushes the movable platform backward. As the movable platform moves backward within the drive, the platform raises to bring the spindle motor on the platform into engagement with the hub of the disk cartridge. Additional details of this spindle motor loading mechanism are provided in co-pending application Ser. No. 08/398,576, entitled "Moveable Internal Platform for a Disk Drive".

Other prior art spindle motor loading mechanisms are described in published International Application No. WO 93/18507, U.S. Pat. No. 5,317,464 (Witt et al.) and U.S. Pat. No. 4,663,677 (Griffith et al.), the latter of which is assigned to the same Assignee as the present invention. All of these references describe removable cartridge disk drives in which the spindle motor is moved vertically into engagement with the hub of a disk cartridge upon insertion of the cartridge into the disk drive. In each case, movement of the spindle motor is effected through a complex series of mechanical linkages. The complexity of such mechanical linkages increases the manufacturing costs of these disk drives. Moreover, each of these prior art disk drives requires manual operation by the user. For example, in both U.S. Pat. No. 4,663,677 and Published International Application No. WO 93/18507, the spindle motor is brought into engagement with the disk cartridge by the manual operation of a lever disposed on the front of the drive chassis. Movement of the lever is translated into movement of the spindle motor by a series of linkages, cams and gears. In U.S. Pat. No. 5,317,464, the manual closure of a drive door is translated through a series of linkages and gears into vertical movement of the spindle motor.

U.S. Pat. No. 4,482,993 discloses a compact disk player that employs a motor driven cam member to move the spindle motor of the drive vertically into engagement with the central hub of a compact disk. The loading mechanism is not designed for use with disk cartridges of the type described above. Rather, the disclosed drive is designed to receive standard compact disks that are not contained within a cartridge housing. An opto-electronic switch detects insertion of a compact disk into the drive and activates the motor driven cam member in order to move the spindle into engagement with the disk hub. As the cam mechanism brings the spindle motor into engagement with the disk hub, the mechanism contacts a mechanical switch that deactivates the cam mechanism. Activation of an ejection button causes the motorized cam mechanism to be reactivated, thereby lowering the spindle motor.

An improved automatic spindle motor loading mechanism utilizing a motorized ring assembly is described in co-pending application Ser. No. 08/438,255, entitled "Disk Drive Having An Automatic Spindle Loading Mechanism." The mechanism described therein is employed in the popular and commercially successful Iomega JAZ™ drive.

High-capacity removable cartridge disk drives, such as the Iomega ZIP™ and JAZ™ drives, are becoming increasingly popular with users of desktop personal computers and workstations. Both the Iomega ZIP™ and JAZ™ disk drives are presently available in an internal configuration, which can be installed in the standard drive bay of a desktop personal computer or workstation, and in an external configuration which can be connected to an external input/output port on a computer. In order to provide the functionality of such high-capacity removable cartridge disk drives in a laptop or notebook computer platform, the overall profile of the drive must be reduced to fit within the low-profile drive bays typically found on such small computers. Unfortunately, the disk drive apparatus and spindle motor loading mechanisms disclosed in the aforementioned references do not provide the reduced profiles necessary for use in laptop and notebook computers. Additionally, these prior art mechanisms are mechanically complex and increase the cost of drive manufacture. These and other disadvantages make such disk drive apparatus and spindle motor loading mechanisms impractical for use in low-profile laptop and notebook computer systems. Accordingly, there is a need for an improved disk drive apparatus and spindle motor loading mechanism that achieves a low profile and that is simple, cost effective and precise. The present invention satisfies this need.

SUMMARY OF THE INVENTION

The present invention is directed to a disk drive apparatus of the type that receives a removable disk cartridge. According to the present invention, the disk drive apparatus comprises an eject member mounted on a chassis of the disk drive apparatus. The eject member moves in tandem with the disk cartridge from a first position to a second position upon insertion of the disk cartridge into the disk drive apparatus. The eject member has a projection formed thereon. A first spring biases the eject member in a direction toward the first position and opposite the direction of insertion of the removable disk cartridge. In a preferred embodiment, the eject member comprises a slide plate slidably mounted on the chassis and having an engaging hook that engages a forward end face of the data cartridge upon insertion of the cartridge into the disk drive apparatus to cause the slide plate to slide in tandem with the cartridge from the first position to the second position.

A motor ring assembly mounted on the chassis comprises a rotating member that rotates between an unloaded position and a loaded position. A spindle motor is mounted in the motor ring assembly such that rotation of the rotating member from its unloaded position to its loaded position causes the spindle motor to translate vertically into engagement with a hub of the removable disk cartridge.

The rotating member has a first cam surface that engages the projection on the eject member when the eject member is in its first position and the rotating member is in its unloaded position, to prevent the rotating member from rotating toward the loaded position. The rotating member further has a second cam surface that extends substantially perpendicular to the first cam surface and that engages the projection on the eject member when the eject member is in its second position and the rotating member is in its loaded position, to lock the eject member in its second position. According to one important feature of the present invention, the rotating member further has a lead-in cam angle surface that extends between the first and second cam surfaces at an angle thereto. A second spring biases the rotating member in a direction of rotation toward its loaded position.

Means are provided for rotating the rotating member from its loaded position toward its unloaded position against the force of the second spring such that the second cam surface of the rotating member moves past the projection on the eject member, thereby allowing the eject member to move back toward the first position under the force of the first spring. This, in turn, allows the projection on the eject member to push against the lead-in cam angle surface of the rotating member to rotate the rotating member further toward its unloaded position. Thus, in accordance with this aspect of the present invention, the lead-in cam angle surface of the rotating member serves to reduce the amount of initial rotation required to rotate the rotating member to the edge of the lead-in cam angle surface. The rotating member need only be initially rotated to the edge of the lead-in cam angle, at which point the force of the projection on the eject member takes over and pushes the rotating member further toward its unloaded position as the eject member springs back to its first position. This is advantageous when the means by which the initial rotation is effected has limited travel.

According to another feature of the present invention, the means for initially rotating the rotating member from the loaded position toward the unloaded position comprises a shape memory alloy wire connected between the chassis and the rotating member. The shape memory alloy wire contracts upon application of an electrical current thereto to cause the rotation.

According to another important feature of the present invention, the spring that biases the rotating member in its loaded position provides a constant and continual force on the rotating member to maintain the rotating member in its loaded position. In this manner, the use of motor ring cam slots having plateau regions, such as are typically found in prior art motor ring assemblies, are not needed.

According to yet another feature of the present invention, the slide plate that forms the eject member in the preferred embodiment, has at least one flexure that has a projection formed thereon. The flexure moves from a position away from the cartridge, to a position adjacent the cartridge as the cartridge and slide plate move in tandem upon insertion of the disk cartridge into the disk drive apparatus. The projection on the flexure moves into engagement with a reference hole on the cartridge as the slide plate and cartridge reach the second position, in order to lock the cartridge in place within the disk drive apparatus.

These and other features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 7 is a side view of the motor ring assembly, showing the rotating member of the motor ring assembly in an unloaded position;

FIG. 8 is a side view of the motor ring assembly of FIG. 7, showing the rotating member of the motor ring assembly in a loaded position;

DETAILED DESCRIPTION OF THE PREFERRED EMBODIMENT

Figure 1:
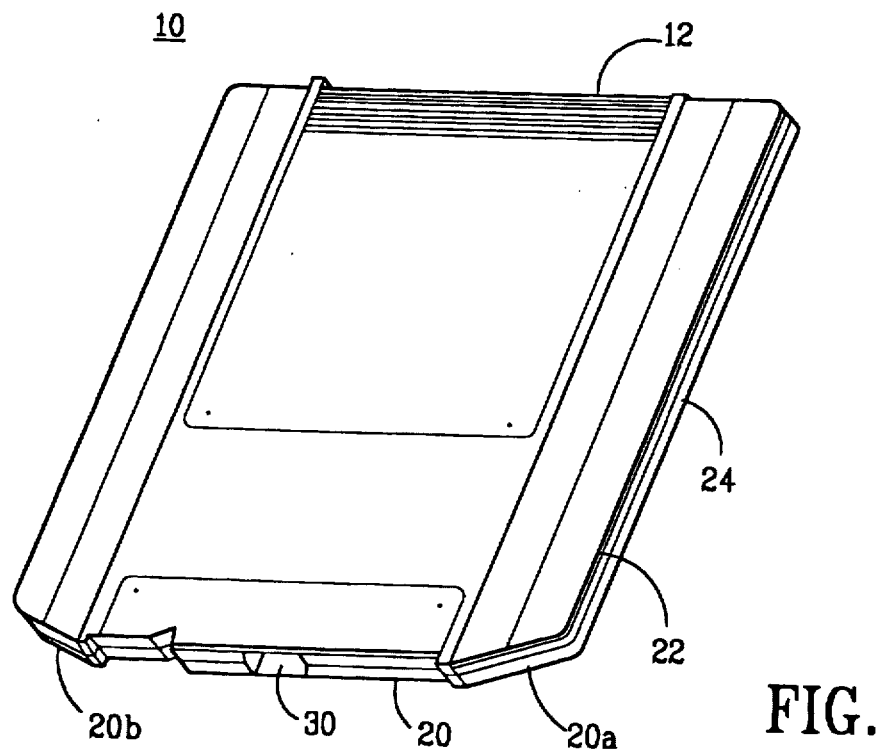
FIG. 1 shows a disk cartridge adapted for use in the disk drive apparatus of the present invention.
Figure 2:
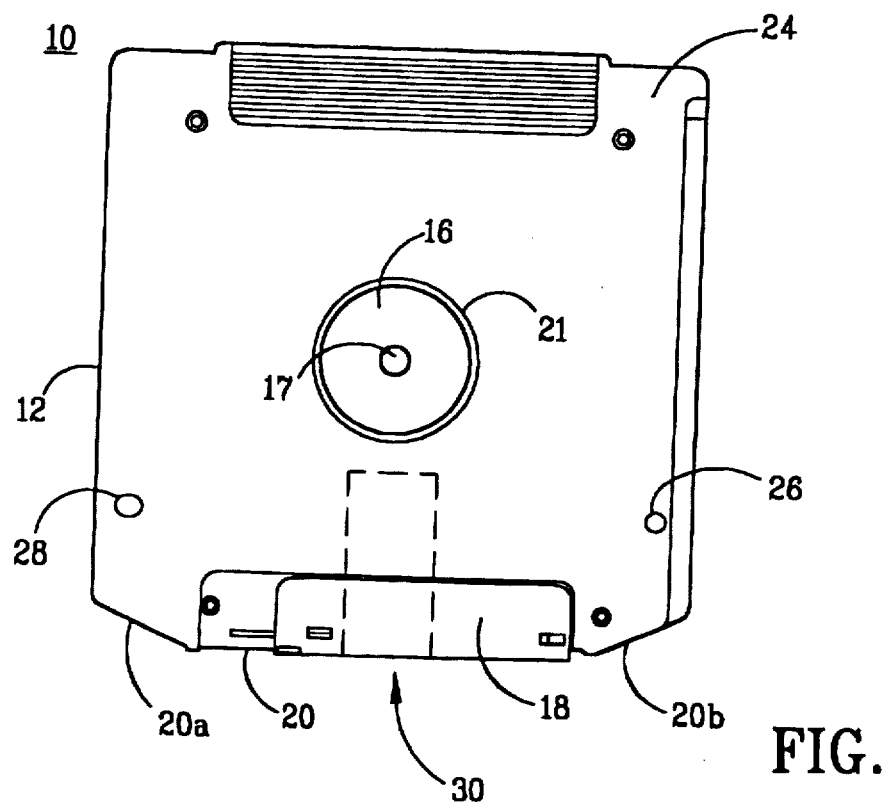
FIG. 2 is a bottom view of the disk cartridge of FIG. 1.

Referring to the drawings, wherein like numerals indicate like numerals throughout, there is shown in FIGS. 1 and 2 an exemplary disk cartridge 10 adapted for use in the disk drive apparatus of the present invention. As shown, the disk cartridge 10 comprises an outer casing 12 having upper and lower shells 22, 24 that mate to form the casing. The front peripheral edge 20 of the disk cartridge 10 has angled outer edges 20a, 20b. Preferably, the upper and lower shells 22, 24 of the outer casing 12 are formed of plastic.

A disk-shaped information storage medium (not shown) is affixed to a hub 16 that is rotatably mounted in the casing 12.

In the present embodiment, the storage medium comprises a flexible magnetic storage medium, however, in other embodiments, the disk may comprise a rigid magnetic disk, a magneto-optical disk or an optical storage medium. An opening 21 on the bottom shell 24 of the casing 12 provides access to the disk hub 16. A head access opening 30 in the front peripheral edge 20 of the disk cartridge 10 provides access to the surfaces of the storage medium by the read/write heads of the disk drive apparatus.

A shutter 18 (not shown in FIG. 1) is provided on the front peripheral edge 20 of the disk cartridge 10 to cover the head access opening 30 when the cartridge is not in use. When the cartridge is inserted into the disk drive apparatus, the shutter 18 moves to the side exposing the head access opening 30 and thereby providing the read/write heads of the drive with access to the storage medium.

Figure 3:
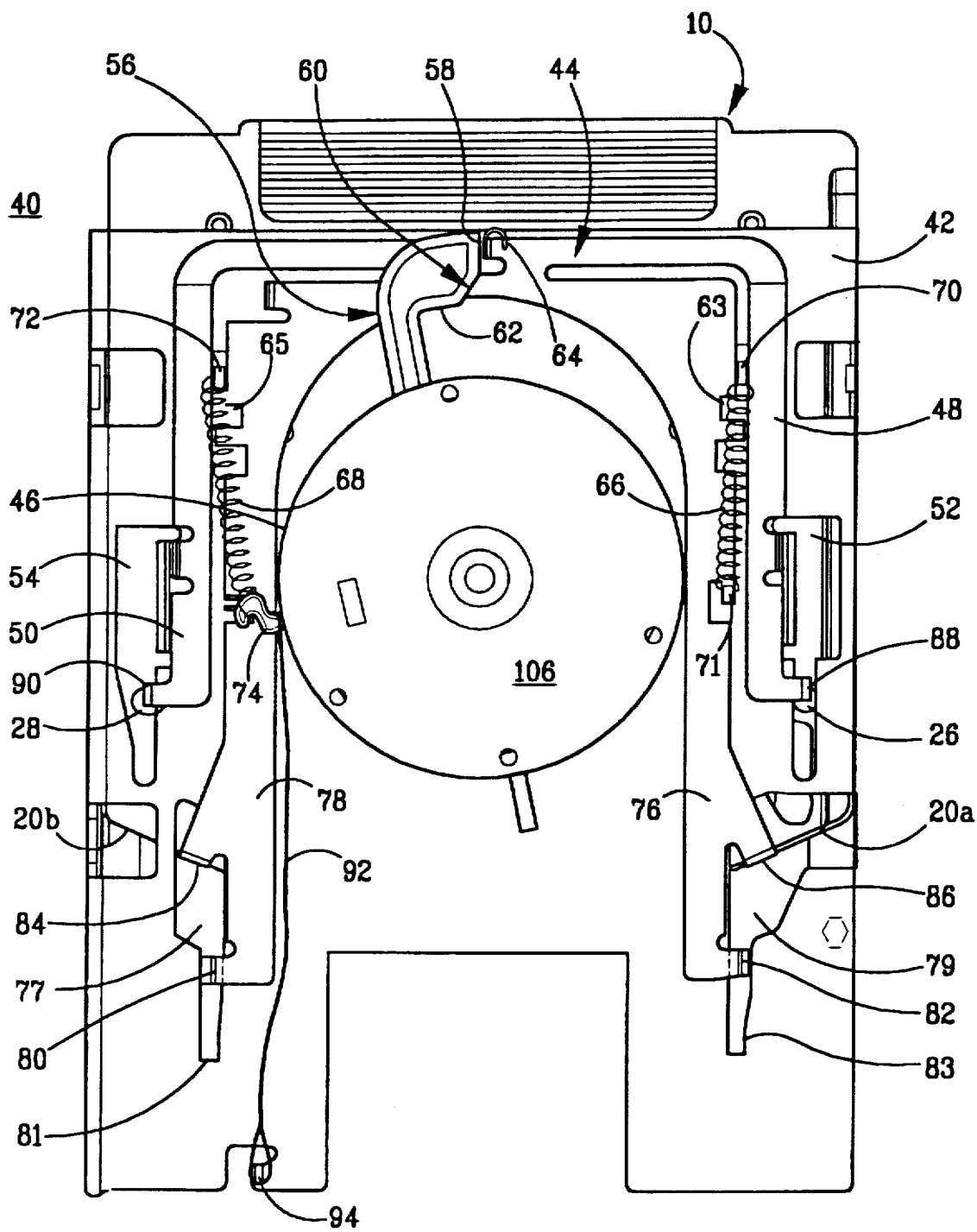
FIG. 3 is a bottom view of a disk drive apparatus in accordance with a preferred embodiment of the present invention, showing the disk cartridge of FIG. 1 at an initial stage of insertion therein.
Figure 4:
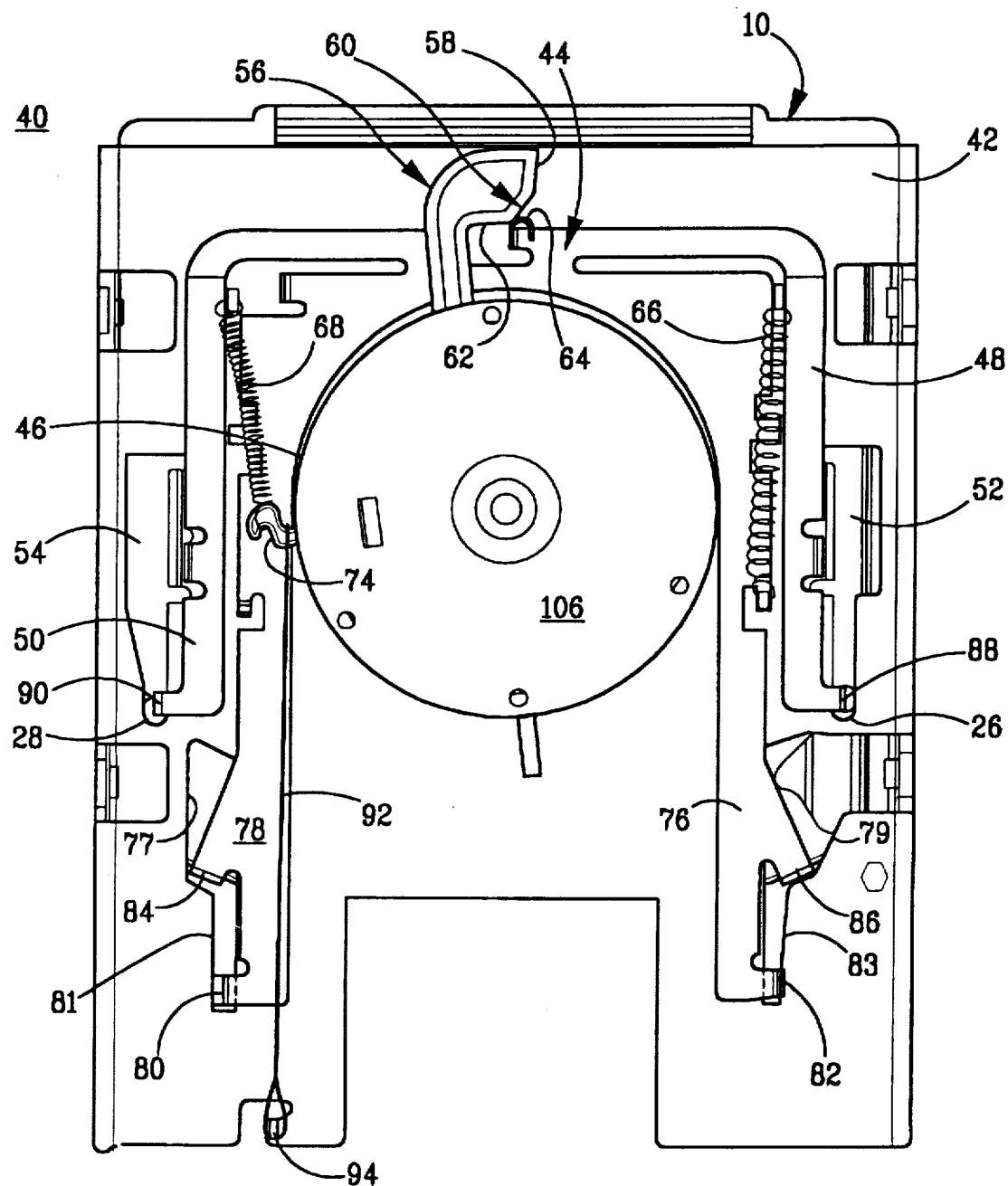
FIG. 4 is a bottom view of the disk drive apparatus of FIG. 3, showing the disk cartridge at an intermediate stage of insertion therein.
Figure 5:
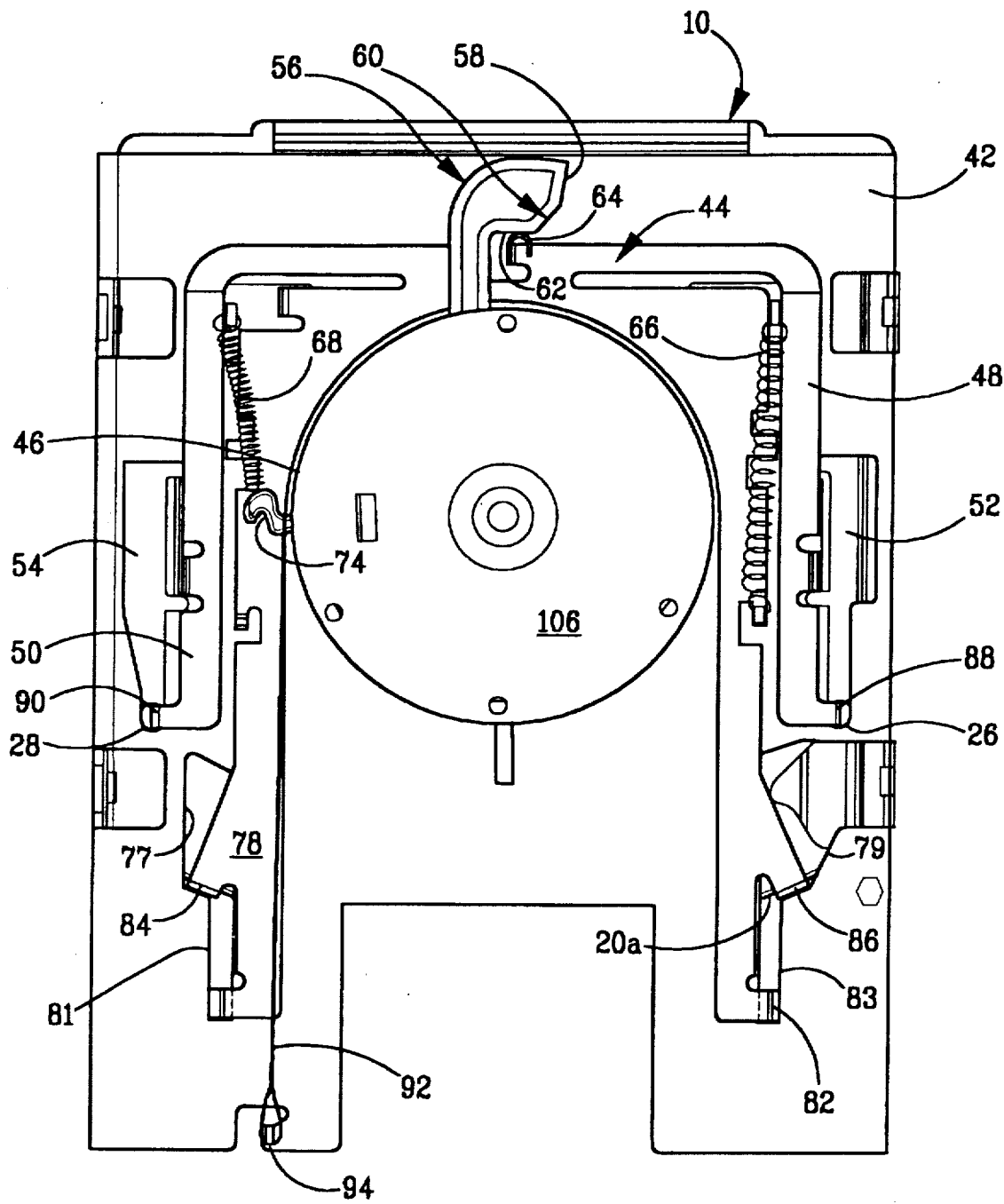
FIG. 5 is a bottom view of the disk drive apparatus of FIG. 3, showing the disk cartridge fully inserted into the disk drive apparatus.

FIGS. 3–5 are bottom views of a disk drive apparatus 40 according to a preferred embodiment of the present invention, showing the disk cartridge 10 in various stages of insertion into the apparatus 40. FIG. 3 shows the cartridge at an initial stage of insertion; FIG. 4 shows the cartridge at an intermediate stage of insertion; and FIG. 5 shows the cartridge in a fully inserted position.

According to the present invention, the disk drive apparatus 40 comprises a rigid chassis 42 that has a pair of opposing guide rails (130, 132 of FIG. 10) that guide the disk cartridge 10 into the apparatus. A slide plate 44 is slidably mounted on the chassis 42 and is capable of moving from a first position (FIG. 3—cartridge not inserted) to a second position (FIG. 5—cartridge fully inserted). A first spring 66, which is attached at one end to a hook 70 on the chassis and at the other end to a hook 71 on the slide plate, biases the slide plate in a direction toward its first position (FIG. 3).

The slide plate 44 has two legs 76, 78 that extend lengthwise of the disk drive apparatus. Tabs 80, 82 formed at the proximal ends of the legs 76, 78 extend through, and ride along, narrow slots 81, 83 in the chassis. The tabs 80, 82 hold the rear of the slide plate 44 on the chassis 42. The other end of the slide plate 44 is slidably held on the chassis by means of two tabs 63, 65 formed on the chassis 42 (see also, FIG. 10), which overlap respective edges of the legs 76, 78 of the slide plate 44.

Each leg 76, 78 of the slide plate 44 has a cartridge engaging hook 84, 86 that extends through a cut-out 77, 79 in the chassis 42 to engage a respective angled outer edge 20a, 20b on the forward end face of the disk cartridge 10. FIG. 3 illustrates the position of the disk cartridge at a point where the outer edges 20a, 20b initially come into contact with the respective engaging hooks 84, 86 of the slide plate 44. Referring to FIG. 4, as the disk cartridge 10 is pushed further into the chassis 42 (by the user), the slide plate 44 moves in tandem with the disk cartridge by means of the engaging hooks 84, 86, against the force of the first spring 66. The fully inserted position of the disk cartridge 10 and slide plate 44 (i.e., the second position of the slide plate), is illustrated in FIG. 5.

In accordance with the present invention, the slide plate 44 and its respective engaging hooks 84, 86 define an eject member for receiving and ejecting the disk cartridge to and from the disk drive apparatus. In other embodiments, the eject member may take other forms, and the present invention is by no means limited to the particular configuration of the eject member described herein.

Further according to the present invention, the disk drive apparatus 40 additionally comprises a motor ring assembly 46 that is mounted to the chassis 42, as described hereinafter in greater detail. In the preferred embodiment, the motor ring assembly comprises a stationary member 96 (see FIG. 6), which is affixed to the chassis 42, and a rotating member 106 that is rotatably mounted on the stationary member 96. The rotating member 106 rotates between an unloaded position (FIG. 3) and a loaded position (FIG. 5). A second spring 68, which is connected at one end to a hook 72 on the chassis and at the other end to a hook 74 on the outer circumference of the rotating member 106, biases the rotating member 106 in a direction of rotation toward its loaded position (ie., clockwise in FIG. 3).

The rotating member 106 of the motor ring assembly 46 has a cam member 56 extending substantially radially outwardly therefrom. The cam member has a first cam surface 58, a second cam surface 62 disposed substantially perpendicularly to the first cam surface 58, and a lead-in cam angle surface 60 that extends between the first and second cam surfaces 58, 62 at an angle thereto. When no cartridge is inserted in the disk drive apparatus 40, and the slide plate 44 is therefore in the position shown in FIG. 3, a projection 64 on the slide plate 44 abuts the first cam surface 58 of the cam member 60 and prevents the rotating member 106 of the motor ring assembly 46 from rotating toward its loaded position (FIG. 5) under the force of the second spring 68.

Referring next to FIG. 4, as the disk cartridge is inserted into the disk drive, and the slide plate 44 begins to move toward its second position (FIG. 5), the projection 64 on the slide plate 44 moves past the edge of the first cam surface 58, onto the lead-in cam angle surface 60. As the projection 64 moves along the lead-in cam angle surface 60, the rotating member begins to move (clockwise in FIG. 3) toward its loaded position under the force of spring 68.

Referring next to FIG. 5, as the slide plate 44 moves into its second position 44 (cartridge fully inserted), the projection 64 moves past the lead-in cam angle surface 60, allowing the rotating member 106 to rotate into its fully loaded position. Thus, in FIG. 5, the disk cartridge is fully inserted, the slide plate has reached its second position, and the rotating member 106 of the motor ring assembly 46 is in its fully loaded position. As described hereinafter in greater detail, rotation of the rotating member 106 into its loaded position (FIG. 5) brings a spindle motor 102 (see, FIG. 6), which is mounted in the motor ring assembly 46, into engagement with the hub 16 of the disk cartridge 10 in order to rotate the hub 16 at high speeds. At this point, the projection 64 is captured by, and abuts, the second cam surface 62 of the cam member 56, locking the slide plate 44 in place and preventing it from moving back toward its first position under the force of spring 66.

According to another important feature of the present invention, a portion of the slide plate 44 is cut-out to form long flexures 48, 50 having cartridge locating projections 88, 90 formed at their respective ends. As the slide plate 44 moves in tandem with the disk cartridge toward the fully inserted position (FIG. 5), the flexures 48, 50 travel along inclined cam slots (described hereinafter) to drive the cartridge locating projections 88, 90 through cutouts 52, 54 in the chassis and into engagement with the reference holes 26, 28 on the cartridge 10. In this manner, the reference holes 26, 28 on the cartridge 10 and the respective cartridge locating projections 88, 90 on the slide plate 44 are synchronized to come together just as the cartridge reaches its fully inserted position. In other embodiment, the slide plate 44 may have only a single flexure (48 or 50), having a projection that engages one of the reference holes (26 or 28) on the cartridge 10.

According to another feature of the present invention, a shape memory alloy wire 92 is attached between the hook 74 on the rotating member and a hook 94 at the rear end of the chassis 42. Shape memory alloy wires contract like muscles when electrically driven. Due to the resistance of a shape memory alloy wire, electrical current applied to the wire causes the temperature of the wire to increase, which, in turn, changes the crystal structure of the alloy, causing the wire to contract by several percent of its length. This phenomenon is referred to as the shape memory phenomenon. The wire is easily stretched back to its original length after it cools back to room temperature. In the present embodiment, the shape memory alloy wire 92 is made of nickel-titanium, and is available from Dynalloy, Inc., 18662 MacArthur Blvd., Suite #103, Irvine, Calif. 92715 under the trademark Flexinol™. In the present embodiment, the Flexinol™ wire is 0.005" in diameter, and, in its relaxed state, extends from hook 94 to hook 74 approximately 85 mm, and then is doubled over and extends back to hook 94 for a total length of approximately 170 mm.

Still referring to FIG. 5, in accordance with the present invention, when it is desired to eject the disk cartridge 10 from the disk drive apparatus 40, the shape memory alloy wire 92 is used to initiate rotation of the rotating member 106 back toward its unloaded position (i.e., counterclockwise in FIG. 5). Shape memory alloy wires, including the Flexinol™ wire 92 of the preferred embodiment, provide a limited amount of shrinkage for practical use. According to an important feature of the present invention, rather than using the shape memory alloy wire 92 to completely unload the spindle motor before the cartridge is ejected, the lead-in cam angle 60 is used to allow the eject force of the slide plate 44 to finish the unloading of the spindle motor. Specifically, when the shape memory alloy wire 92 contracts upon application of electrical current thereto (in a conventional manner), the rotating member 106 of the motor ring assembly 46 rotates back toward its unloaded position (counterclockwise in FIGS. 3–5), until the second cam surface 62 has just moved past the projection 64 on the slide plate 44, and the projection 64 is poised at the edge of the lead-in cam angle 60 (FIG. 4). At this point, the spindle motor 102 has become unchucked from the hub 16 of the disk cartridge 10, and the projection 64 on the slide plate 44 is free of the confines of the second cam surface 62. The slide plate 44 therefore begins to move back toward its first position under the force of the first spring 66. During this movement, as the projection 64 on the slide plate 44 pushes against the lead-in cam angle surface 60, the rotating member 106 is further rotated toward its fully unloaded position. As the slide plate reaches its first position, as shown in FIG. 3, the projection 64 moves back onto the first cam surface 58 of the cam member 56, at which point the rotating member 56 has reached its fully unloaded position and is once again held in place by the projection 64.

By providing the lead-in cam angle surface 60 between the first and second cam surfaces 58, 62, the amount of rotation that must be achieved by contraction of the shape memory alloy wire 92 is reduced; the shape memory alloy wire 92 need only contract enough to rotate the rotating member 106 to the edge of the lead-in cam angle 60. Thus, the problem of limited shrinkage of the shape memory alloy wire 92 is overcome. As can be appreciated, this aspect of the present invention can be applied to reduce the amount of rotation needed from any driving means, not just the shape memory alloy wire 92 employed in the present invention. For example, any drive mechanism that has limited travel, including, for example, a small electric motor and/or gear driven assembly, can benefit from the provision of the lead-in cam angle surface 60 to reduce the amount of travel that is needed to In the present embodiment, an electrical current of 250 mA is applied to the shape memory allow wire 92, in a conventional manner. According to a data sheet supplied with the Flexinol™ wire used in the preferred embodiment, a current of 250 mA results in a maximum pull force of 230 gms. Because the Flexinol™ wire (total length approximately 170 mm) is doubled over between hooks 94 and 74, the 230 gms pull force is effectively doubled to about 460 gms. Total shrinkage of the shape memory alloy wire 92 during this process is approximately 3.5% of its length, or approximately 3.0 mm of shrinkage between hooks 94 and 74.

In the present embodiment, the 250 mA current is applied to the shape memory alloy wire 92 for 1 sec., and then the disk drive apparatus checks to see if the disk cartridge 10 has been successfully ejected. If the cartridge is not yet successfully ejected, the 250 mA current is again applied to the shape memory alloy wire 92 for 1 sec. This continues until it is determined that the cartridge has been successfully ejected. Detection of successful cartridge ejection can be performed in any conventional manner.

Figure 6:
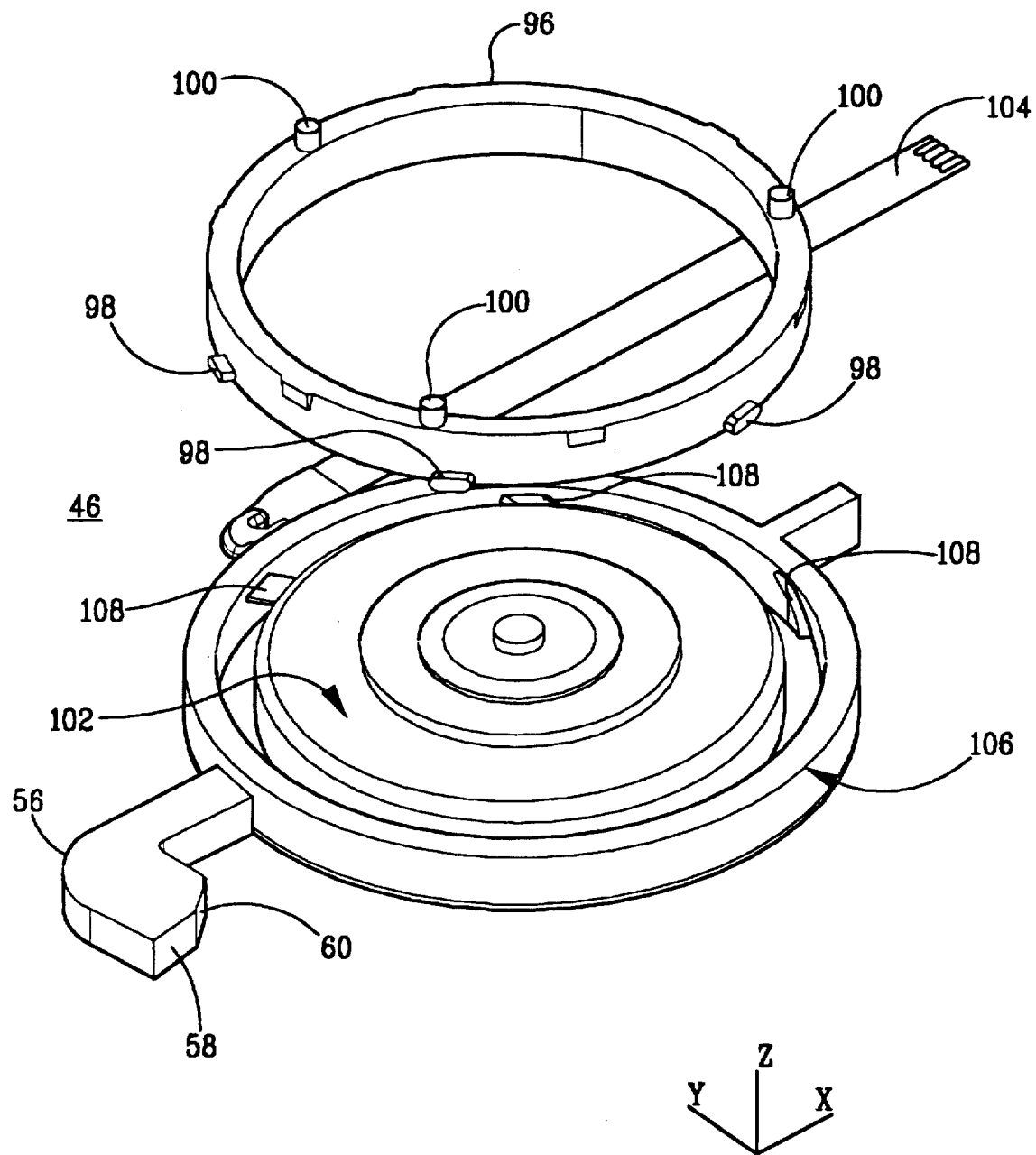
FIG. 6 is an exploded assembly view of the motor ring assembly of the disk drive apparatus of FIG. 3.

FIG. 6 is an exploded perspective view of the motor ring assembly 46, showing further details thereof. In this perspective, the motor ring assembly 46 is viewed from the opposite side as that shown in FIGS. 3–5. FIG. 7 is a side view of the motor ring assembly 46, showing the rotating member 106 in its fully unloaded position (FIG. 3). FIG. 8 is a side view of the motor ring assembly 46 showing the rotating member 106 in its fully loaded position (FIG. 5).

According to the preferred embodiment, the motor ring assembly 46 comprises the stationary member 96 and the rotating member 106, which is rotatably mounted on the stationary member. The stationary member 96 has a plurality of locating features 100 that mate with corresponding holes 126 (see, FIG. 10) in the surface of the chassis 42 to secure the stationary member 96 to the chassis 42. A spindle motor 102, which spins at high speeds to rotate the hub 16 of the disk cartridge, is, in the present embodiment, mounted in the rotating member 106. A flex circuit 104 (not shown in other Figures) provides electrical signals to the spindle motor to control its rotation.

In the present embodiment, the stationary member 96 has a plurality of radially extending cam projections 98, and the rotating member 106 has a corresponding plurality of inclined cam slots 108 into which the cam projections 98 extend when the stationary and rotating members 96, 106 are assembled together. FIG. 7 shows the position of the cam projections 98 within the cam slots 108, when the rotating member 106 is in its fully unloaded position. As the rotating member rotates under the force of spring 68 toward its loaded position, the inclined surfaces of the cam slots 108 move against the respective cam projections 98 on the stationary member, causing the rotating member to translate vertically and to bring the spindle motor 102 into engagement with the hub 16 of the disk cartridge 10. FIG. 8 shows the rotating member in its fully loaded position.

While in the present embodiment, the cam projections 98 are formed on the stationary member 96 and the inclined cam slots 108 are formed in the rotating member 106, this could be reversed. Also, the clockwise and counterclockwise rotational directions of the rotating member 106 described herein represent a preferred embodiment and are not meant to be limiting. These directions could be reversed in other embodiments. Furthermore, whereas in the present embodiment, the rotating member 106 forms the outer ring of the assembly and the stationary member 96 forms the inner ring, in other embodiments, this arrangement can be reversed. That is, the inner member can be the one that rotates, while the outer member remains stationary.

According to another important feature of the present invention, unlike prior art motor ring assemblies in which the cam projections are forced onto a plateau region of the corresponding cam slots to maintain engagement of the spindle motor and disk hub (which requires substantial additional rotating force), the cam slots 108 of the motor ring assembly of the present invention do not include such a plateau region. Rather, engagement of the spindle motor 102 and disk hub 16 in the present embodiment is maintained by the continual rotating force applied to the rotating member 106 by the second spring 68. Thus, whereas in the prior art, the rotational force on the rotating member of a motor ring assembly is removed once the cam slots are forced onto the plateau region of the corresponding cam slots, the present invention differs in that a constant and continual force is applied to the rotating member to keep the spindle motor 102 and disk hub 16 engaged; the cam slots 108 do not include a plateau region.

Figure 9:
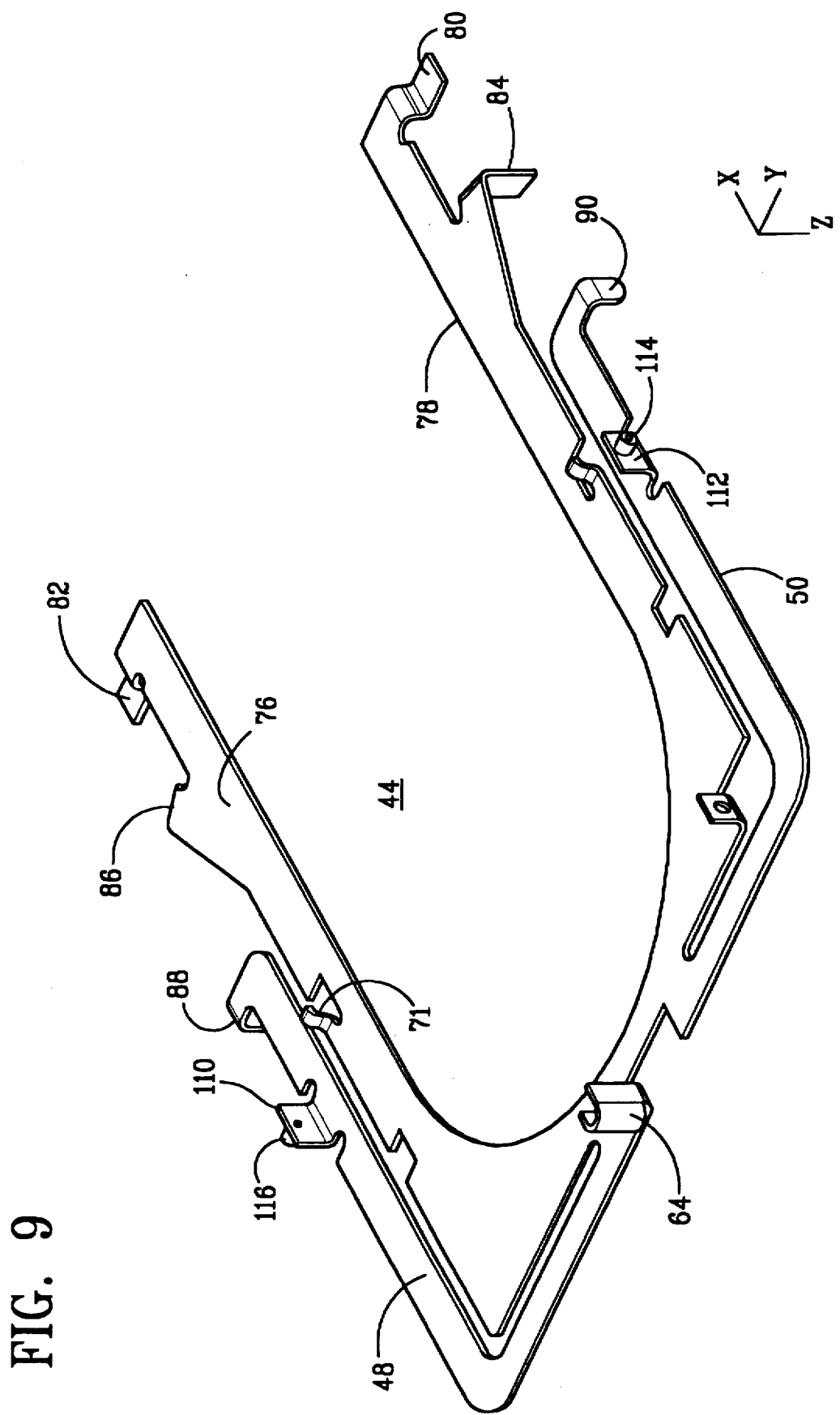
FIG. 9 is a perspective view of the slide member of the disk drive apparatus of FIG. 3.

FIG. 9 is a perspective view of the slide member 44 of the disk drive apparatus of FIGS. 3–5, showing in more detail the various features of the slide plate 44 described above, including, for example, the cartridge engaging hooks 84, 86, the mounting tabs 80, 82, hook 71, projection 64, legs 76 and 78, flexures 48 and 50, and cartridge locating projections 88 and 90. As further shown in FIG. 9, each of the flexures 48, 50 of the slide plate has an upturned tab 110, 112 on which is formed a respective cam projection 116, 114. As described hereinafter, the cam projections 114, 116 ride along corresponding cam slots on the chassis to move the flexures vertically during cartridge insertion and ejection, in accordance with a cartridge locating feature of the present invention.

Figure 10:
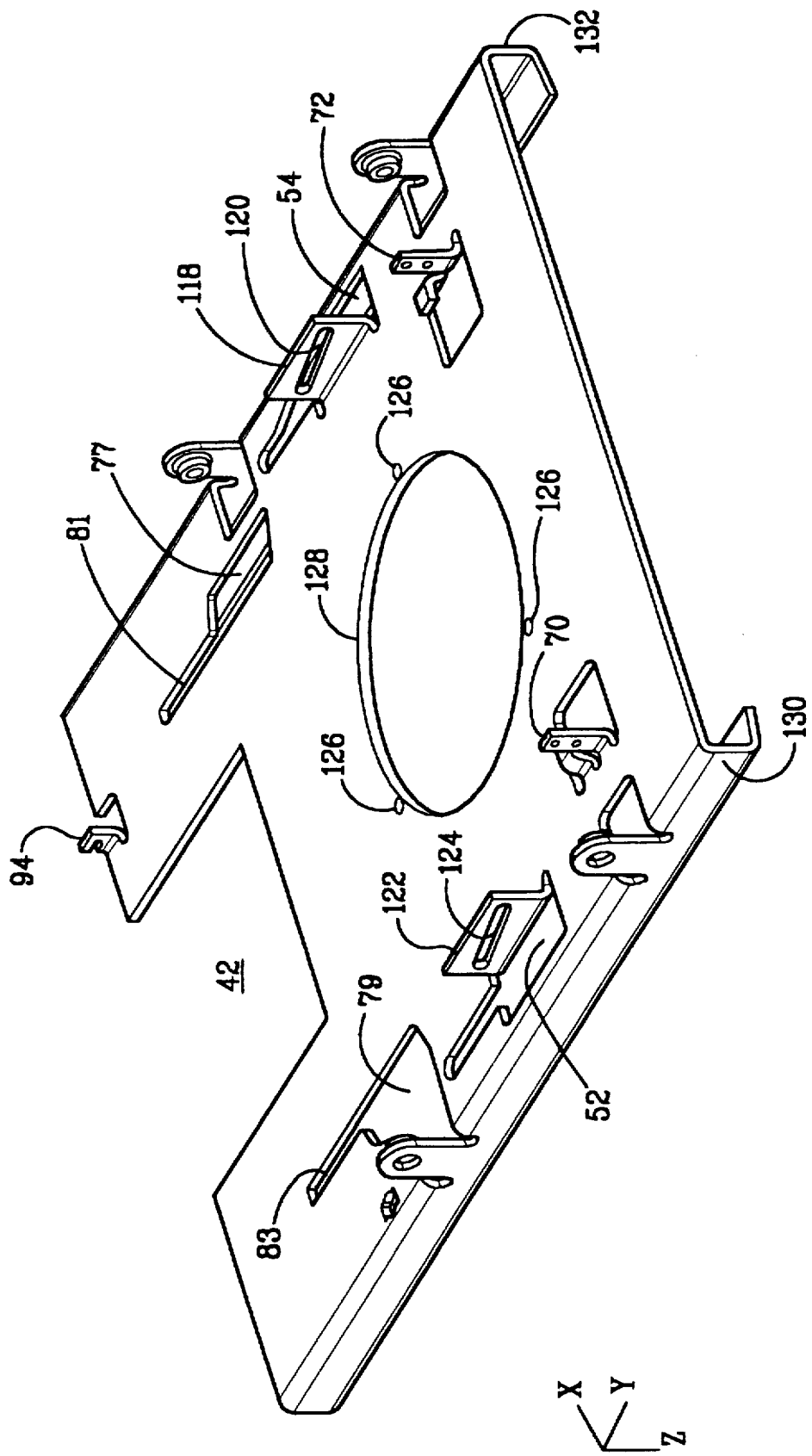
FIG. 10 is a perspective view of the chassis of the disk drive apparatus of FIG. 3.

FIG. 10 is a perspective view of the chassis 42 of the disk drive apparatus, in accordance with a preferred embodiment thereof. FIG. 10 shows further details of the various features of the chassis 42 described above. As shown, the chassis 42 has cutouts 77 and 79 through which the cartridge engaging hooks 84, 86 of the slide plate 44 extend to engage the angled outer edges 20a, 20b of the front peripheral edge of the disk cartridge 10. Narrow slots 81 and 83 provide a means for slidably attaching the slide plate 44 to the chassis 42 using tabs 80 and 82 on the respective legs 76, 78 of the slide plate 44. Tabs 63, 65 overlap respective edges of the legs 76, 78 at the forward end of the slide plate 44 to hold that end of the slide plate 44 on the chassis 42. Cut-outs 52 and 54 are provided, through which the cartridge locating projections 88 and 90 move into and out of engagement with the respective reference holes 26 and 28 on the cartridge. Holes 126 are provided in the chassis to receive the locating features 100 on the stationary member 96 of the motor ring assembly 46. An opening 128 is provided through which the spindle motor 102 engages the hub 16 of the disk cartridge. Hooks 70 and 72 are provided for attachment of the springs 66 and 68, respectively. Hook 94 is provided for attachment of one end of the shape memory alloy wire 94. Opposing guide rails 130 and 132, which are spaced at an interval substantially equal to the width of the disk cartridge 10, are provided to guide the disk cartridge 10 into the chassis. Additionally, upturned tabs 118 and 122 are provided on each side of the chassis 42 adjacent the respective cutouts 54 and 52. The tabs 118 and 122 each have a respective cam slot 120, 124 extending therethrough. The cam slots 120, 124 receive the respective cam projections 114, 116 on the flexures 48, 50 of the slide plate 44, as described hereinafter.

Figure 11:
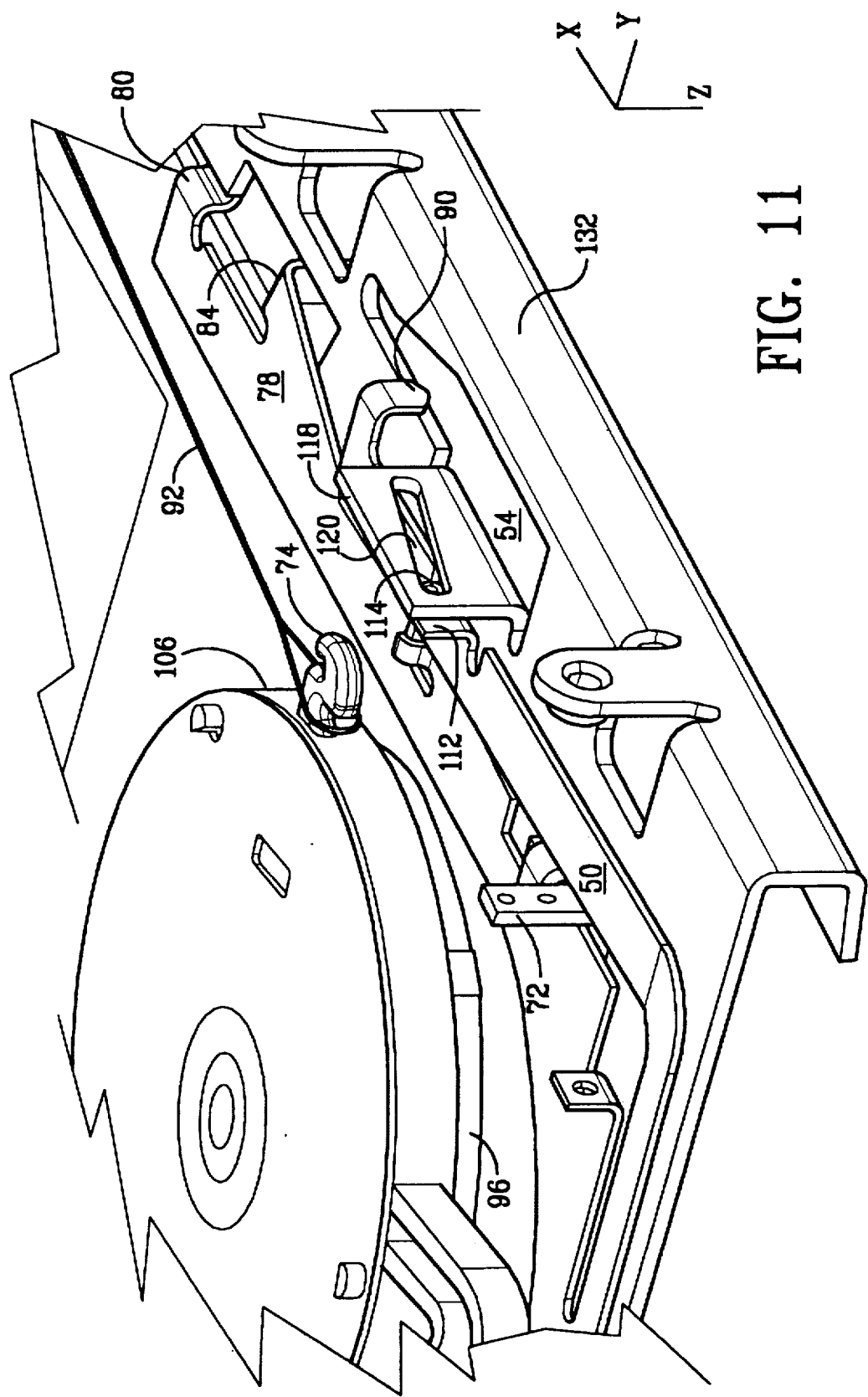
FIGS. 11 and 12 illustrate the movement of the flexures of the slide member as the slide member moves from a first position, at which the cartridge is not inserted in the disk drive apparatus, to a second position in which the cartridge is fully inserted into the disk drive apparatus.
Figure 12:
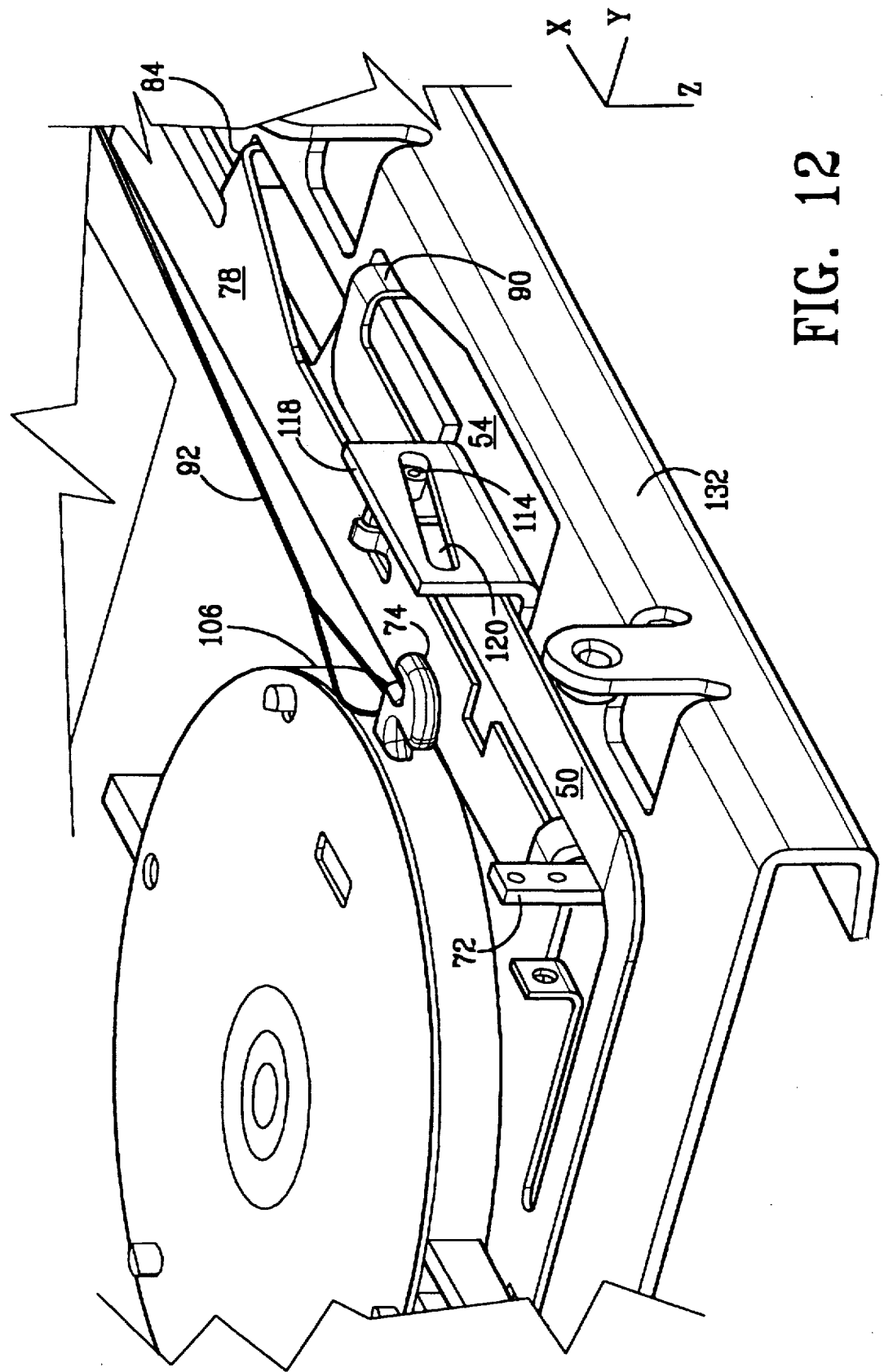

FIGS. 11 and 12 illustrate the cartridge locating feature of the present invention. FIG. 11 shows the position of the slide plate 44 and one of the flexures 50 when no cartridge is inserted in the disk drive apparatus 40. In this position, the cam projection 114 on the tab 112 of the flexure 50 is positioned at the highest point of the cam slot 120 on tab 118 of the chassis. In this position, the flexure 50 is raised from the plane of the slide plate such that the cartridge locating projection 90 is pulled upwardly (in FIG. 11) away from the opening provided by cut-out 54. Referring now to FIG. 12, as the cartridge 10 (not shown in FIG. 12) is inserted into the disk drive apparatus, the slide plate 44 moves toward its second position. As a consequence, the cam projection 114 on the flexure 50 moves down the inclined surface of the cam slot 120, thereby bringing the flexure back into the plane of the slide plate 44 and allowing the cartridge locating projection 90 to extend into and through the cut-out 54, where the projection 90 engages the corresponding reference hole 28 on the bottom of the cartridge 10 (as best shown in FIG. 5). The opposite flexure 44 undergoes similar movement. The reference holes 26, 28 on the cartridge 10 and the respective cartridge locating projections 88, 90 on the slide plate 44 are synchronized to come together just as the cartridge 10 reaches its fully inserted position. The cartridge locating projections 88, 90 hold the cartridge in place in the chassis. When the cartridge is ejected, and the slide plate 44 move back to its first position (FIG. 11), the cam projections 114 and 116 move back up the respective cam slots 120, 124, thereby raising the flexures and bringing the cartridge locating projections 88, 90 out of engagement with the cartridge reference holes 26, 28. In other embodiments, the slide plate 44 may have only one flexure (48 or 50), having a projection that engages only one of the reference holes (26 or 28) of the disk cartridge 10.

As the foregoing illustrates, the present invention is directed to a disk drive apparatus having an automatic spindle motor loading mechanism. The various features of the disk drive all contribute to an extremely low-profile, which is advantageous for use in smaller computer systems, such as laptop and notebook computer systems. Additionally, the mechanics of the apparatus are simplified and less costly to manufacture. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A disk drive apparatus of the type that receives a removable disk cartridge, comprising:

an eject member mounted on a chassis of the disk drive apparatus, said eject member moving in tandem with said disk cartridge from a first position to a second position upon insertion of the disk cartridge into the disk drive apparatus, said eject member having a projection formed thereon;

a first spring biasing said eject member in a direction toward said first position and opposite the direction of insertion of said removable disk cartridge;

a motor ring assembly mounted on the chassis and comprising a rotating member that rotates between an unloaded position and a loaded position, said rotating member having a first cam surface that engages said projection when the eject member is in said first position and the rotating member is in said unloaded position to prevent the rotating member from rotating toward said loaded position, and said rotating member having a second cam surface that extends substantially perpendicular to said first cam surface and that engages said projection on said eject member when the eject member is in said second position and the rotating member is in said loaded position to lock the eject member in said second position, said rotating member further having a lead-in cam angle surface that extends between the first and second cam surfaces at an angle thereto;

a second spring biasing the rotating member in a direction of rotation toward said loaded position;

a spindle motor mounted in said motor ring assembly such that rotation of the rotating member from said unloaded position to said loaded position causes the spindle motor to translate vertically into engagement with a hub of said removable disk cartridge; and means for rotating said rotating member from said loaded position toward said unloaded position against the force of said second spring such that said second cam surface of the rotating member moves past the projection on said eject member, thereby allowing the eject member to move back toward said first position under the force of said first spring and allowing the projection on the eject member to push against the lead-in cam angle surface of the rotating member to rotate the rotating member further toward its unloaded position.

2. The disk drive apparatus of claim 1 wherein said means for rotating said rotating member from said loaded position toward said unloaded position comprises a shape memory alloy wire connected between said chassis and said rotating member, said shape memory alloy wire contracting upon application of an electrical current thereto to cause said rotation.

3. The disk drive apparatus of claim 1 wherein said eject member comprises a slide plate slidably mounted on said chassis and having an engaging hook that engages a forward end face of said data cartridge upon insertion of the cartridge into the disk drive apparatus to cause said slide plate to slide in tandem with said cartridge from said first position to said second position.

4. A disk drive apparatus of the type that receives a removable disk cartridge and having a motor ring assembly mounted on a chassis of the disk drive apparatus, said motor ring assembly comprising:

a rotating member that rotates between an unloaded position and a loaded position;

a stationary annular member on which said rotating member is rotatably mounted;

a spring biasing the rotating member in a direction of rotation toward said loaded position, said spring providing a continual spring force to maintain said rotating member in said loaded position; and a spindle motor mounted in said motor ring assembly such that rotation of the rotating member from said unloaded position to said loaded position causes the spindle motor to translate vertically into engagement with a hub of said removable disk cartridge, wherein one of said rotating member and said stationary member having a plurality of cam projections thereon, and the other of said rotating member and said stationary member having a plurality of cam slots that each engage a respective one of said cam projections, said cam slots having inclined surfaces up which said cam projections move when said rotating member rotates toward the loaded position to cause said rotating member to translate vertically into the loaded position.

5. The disk drive apparatus recited in claim 4 further comprising a shape memory alloy wire connected between said rotating member and said chassis, said shape memory alloy wire contracting upon application of an electrical current thereto and causing said rotating member to rotate toward said unloaded position against the force of said spring.

6. The disk drive apparatus recited in claim 4 wherein the inclined surfaces of said cam slots have a constant slope, and wherein said spring provides a continual spring force to maintain said cam projections at a position along said respective inclined surfaces of said cam slots corresponding to the loaded position of said rotating member, until a shape memory alloy wire, connected between said rotating member and said chassis contracts upon application of electrical current thereto to move said cam projections from said position corresponding to the loaded position.

7. A disk drive apparatus of the type that receives a removable disk cartridge and having a motor ring assembly mounted on a chassis of the disk drive apparatus, said motor ring assembly comprising:

a rotating member that rotates between an unloaded position and a loaded position;

a spring biasing the rotating member in a direction of rotation toward said loaded position;

a spindle motor mounted in said motor ring assembly such that rotation of the rotating member from said unloaded position to said loaded position causes the spindle motor to translate vertically into engagement with a hub of said removable disk cartridge; and a shape memory alloy wire connected between said rotating member and said chassis, said shape memory alloy wire contracting upon application of an electrical current thereto and causing said rotating member to rotate toward said unloaded position against the force of said spring.

8. A disk drive apparatus of the type that receives a removable disk cartridge, comprising:

a slide plate slidably mounted on a chassis of said disk drive apparatus, said slide plate engaging said removable disk cartridge and moving in tandem therewith from a first position to a second position upon insertion of the disk cartridge into the disk drive apparatus, said slide plate having a cam projection;

a first spring biasing said slide plate in a direction toward said first position and opposite the direction of insertion of said removable disk cartridge;

a motor ring assembly mounted on the chassis and comprising a rotating member that rotates between an unloaded position and a loaded position, said rotating member having a first cam surface that engages the cam projection on said slide plate when the slide plate is in said first position and the rotating member is in said unloaded position to prevent the rotating member from rotating toward said loaded position, and said rotating member having a second cam surface that engages the cam projection on said slide plate when the slide plate is in said second position and the rotating member is in said loaded position to lock the slide plate in said second position;

a second spring biasing the rotating member in a direction of rotation toward said loaded position;

a spindle motor mounted in said motor ring assembly such that rotation of the rotating member from said unloaded position to said loaded position causes the spindle motor to translate vertically into engagement with a hub of said removable disk cartridge; and a shape memory alloy wire connected between said rotating member and said chassis, said shape memory alloy wire contracting upon application of an electrical current thereto and causing said rotating member to rotate toward said unloaded position against the force of said second spring such that said second cam surface of the rotating member moves out of engagement with the cam projection on said slide plate, thereby allowing the slide plate to move back to said first position under the force of said first spring.

9. The disk drive apparatus of claim 8 wherein movement of the slide plate from said first position to said second position upon insertion of the disk cartridge into said disk drive apparatus causes the cam projection on the slide plate to move past the first cam surface of said rotating member, thereby freeing the rotating member and allowing the rotating member to rotate under the force of said second spring from said unloaded position to said loaded position and causing the second cam surface of the rotating member to move into engagement with the cam projection on said slide plate to lock the slide plate in said second position, and wherein thereafter, application of an electrical current to said shape memory alloy wire causes said rotating member to rotate back toward said unloaded position such that the second cam surface thereof moves past the cam projection on said slide plate, thereby releasing said slide plate and allowing the slide plate to move back to said first position under the force of said first spring.

10. The disk drive apparatus of claim 8 wherein said rotating member further comprises a lead-in cam angle surface extending between said first and second cam surfaces of the rotating member, said lead-in cam angle surface serving to minimize the amount of rotation of the rotating member needed to release the cam projection of said slide plate from engagement with the second cam surface of the rotating member, the force of said slide plate acting against said lead-in cam angle surface through the cam projection thereof to further rotate said rotating member back to said unloaded position.

11. The disk drive apparatus recited in claim 8 wherein said second spring provides a constant and continual spring force to maintain said rotating member in said loaded position.

* * * * *